United States Patent [19]

Naff

[11] Patent Number: 5,076,051
[45] Date of Patent: Dec. 31, 1991

[54] LONG LIFE ARCJET THRUSTER HAVING DIFFUSE CATHODE ARC ATTACHMENT

[75] Inventor: John T. Naff, Pleasanton, Calif.
[73] Assignee: Olin Corporation, Cheshire, Conn.
[21] Appl. No.: 475,582
[22] Filed: Feb. 6, 1990
[51] Int. Cl.$^5$ .............................................. F02K 11/00
[52] U.S. Cl. ................................ 60/203.1; 219/121.51; 313/231.51; 313/362.1
[58] Field of Search .................. 60/200.1, 202, 201, 60/203.1, 39.462, 39.461; 219/121.31, 121.51, 121.41, 121.35; 313/231.41, 231.51, 362.1; 315/111.21, 111.11

[56] References Cited

U.S. PATENT DOCUMENTS 3,400,070   9/1963   Naff ............................ 204/311

Primary Examiner—Leonard E. Smith
Assistant Examiner—John A. Savio, III
Attorney, Agent, or Firm—J. R. Wahl

[57] ABSTRACT

An arcjet thruster comprises a cathode body and anode body tandemly arranged and separated by an insulative propellant injection ring. The cathode body has a cathode cavity therein having a convergent and a divergent portion forming a throat therebetween. The anode body has a divergent cavity therein for producing thrust. The divergent cavity has an upstream portion and a downstream portion. The divergent portion of the cathode and the upstream portion of the anode cavity form a constrictor. A power supply connected between the anode and the cathode bodies is used to produce an arc between the anode and cathode that passes through the constrictor. Propellant is injected in a vortex flow radially into the constrictor so that it divides. A portion of the flow is directed upstream through the throat into the convergent portion of the cathode cavity thus also pushing the cathode arc attachment point into the convergent portion to cause diffuse attachment thereof. The other portion of the propellant pushes the downstream end of the arc into the divergent portion of the anode cavity to cause diffuse attachment of the arc. Thus the vortex flow of the propellant into the constrictor causes diffuse attachment of both the cathode and anode foot attachments which in turn minimizes cathode erosion and lengthens effective arcjet lifetime.

16 Claims, 1 Drawing Sheet

LONG LIFE ARCJET THRUSTER HAVING DIFFUSE CATHODE ARC ATTACHMENT

This invention generally relates to arcjet thrusters for maneuvering spacecraft and, more particularly, is concerned with an electrothermal arcjet thruster having diffuse anode electrode arc attachment.

As is conventionally known, an electrothermal arcjet thruster converts electrical energy to kinetic energy by heat transfer from an arc discharge to a flowing propellant and expansion of the heated propellant through a nozzle. These electrothermal arcjet thrusters have as common features an anode in the form of a nozzle body and a cathode in the form of an axially aligned cylindrical rod with a generally conical tip. The cathode rod and nozzle body define an arc chamber which may include a constrictor in the upstream portion of the nozzle body and an expansion portion downstream thereof. The cathode rod is aligned on the longitudinal axis of the nozzle body and positioned with its conical tip extending into the upstream end of the arc chamber in spaced relation to the constrictor so as to define a gap therebetween.

An electrical arc is passed from the cathode to the anode and a propellant gas is injected into the gap in a vortex flow which passes through the constrictor into the expansion region of the nozzle. This flow of propellant gas pushes the arc attachment foot on the anode through the constrictor causing the arc to attach to the anode in the divergent expansion portion downstream of the constrictor in a diffuse manner. This diffuse attachment minimizes erosion of the anode and the lifetime reducing effect of anode erosion by spreading the arc attachment over a large area of the anode.

However, the upstream arc attachment at the cathode is concentrated on the cathode tip. The arc footprint on the tungsten cathode is small and therefore current densities can be on the order of several hundred to $10^5$ amps per square centimeter. Current density at the tip of the cathode is very high, erosion of the cathode tip is significant. Over a period of time, the tip of the cathode erodes away, increasing the gap between the cathode tip and the anode. As the power required to draw and maintain the arc between the cathode and the anode and the arcjet efficiency are in part determined by the spacing between the cathode and anode, this erosion eventually limits the lifetime of the conventional arcjet thruster. The lifetime of conventional arcjet thrusters is presently limited to about a thousand hours.

Additionally, conventional arcjet designs are limited in size. For a given size, the achievable thrust also is limited by a current/pressure material dependent threshold. Most current designs run on the order of 50 kw power levels. The cathode of conventional arcjet designs typically is tungsten or thoriated tungsten. The current/pressure threshold limitation for tungsten limits the power to about 250 kw or less. If current is increased above the threshold at a given pressure, or conversely, pressures are raised above the threshold at a constant current, the current density limit for tungsten type electrodes is exceeded and the tungsten erodes very quickly. This accelerated erosion typically appears as a deep and fast growing hole in the cathode at the point of arc foot attachment and is caused by vaporization of the tungsten under the influence of the arc.

One method of reducing the cathode erosion involves passing the propellant gas alongside or through the cathode rod through a central bore such as is described in allowed U.S. Pat. application, Ser. No. 150,591, now U.S. Pat. No. 4,926,623 assigned to the assignee of the present invention. The flow of propellant along side or through the cathode tends to enhance heat dissipation in the cathode and thus reduce the rate of erosion of the cathode tip. However, erosion of the cathode tip still occurs, eventually causing an increase in gap width thus limiting the lifetime of the thruster.

Another approach to minimize cathode and anode erosion, in this case in a plasma processing apparatus, is disclosed in my U.S. Pat. No. 3,400,070 issued Sep. 3, 1968. This patented device is an arc plasma processing head for processing liquid or gaseous feed materials such as natural gas to produce acetylene. This device minimizes cathode and anode corrosion by injecting the feed chemical materials in such a manner that the arc is forced to diffusely attach in both the anode and the cathode to enhance the efficiency of material chemical processing. However, this device was not envisioned to and did not produce useful thrust.

Consequently a need exists for a fresh approach to cathode arc attachment in an arcjet thruster in a way which will minimize the effects of cathode erosion, and enhance the efficiency, the power capabilities, and the effective thruster life.

It is therefore an object of the present invention to provide an arcjet thruster having a diffuse cathode arc attachment.

It is another object of the present invention to provide an arcjet thruster having a substantially increased lifetime.

It is another object of the present invention to provide an arcjet thruster having a low current density at the cathode arc attachment region.

It is another object of the present invention to provide an arcjet thruster tolerant of a large erosion volume.

It is a still further object of the present invention to provide an arcjet thruster having an increased overall efficiency.

The present invention provides a longlife arcjet thruster designed to satisfy the aforementioned needs. The arcjet thruster in accordance with the present invention includes an electrically conductive cathode body tandemly arranged with an electrically conductive anode body. The cathode body has a cavity therein with an open end. The cavity is symmetrical about a longitudinal central axis through the arcjet thruster and has a convergent portion forming a throat at or near the open end. Preferably, this cathode cavity has a generally convergent cone shape. The electrically conductive anode body has a cavity therein that is tandemly positioned coaxially with, and communicating with the open end of the cathode cavity. The anode cavity forms a nozzle with a divergent nozzle portion expanding away from the throat of the cathode cavity. The cathode body and the anode body together define therebetween a passage along the central axis.

The cathode and anode bodies are spacially separated and insulated from one another by a propellant injection means for a injecting a propellant flow into the passage between the bodies so that as the propellant enters the passage the flow splits. One portion of the propellant passes upstream through the passage and through throat, into the cathode cavity. The other portion of the propellant passes downstream through the passage and through the divergent nozzle portion of the anode cavity to produce thrust.

An electrical current source such as a DC power supply is connected between the anode and the cathode to produce an electrical arc between the anode and the cathode. The arc is forced, by the split propellant flow, to pass through the passage. The propellant portion passing into the passage and upstream through the throat into the convergent portion of the cathode cavity pushes one end of the arc into the convergent portion of the cathode cavity so that it attaches to the cathode in a diffuse manner. The other portion of the propellant passing downstream into the passage into the divergent portion of the anode cavity pushes the other end of the arc downstream into the divergent portion of the anode cavity so that it attaches to the anode, also in a diffuse manner.

The injection means in the arcjet thruster in accordance with the present invention preferably includes an insulating means between the anode and cathode bodies for electrically separating the bodies along the central axis. The injection and insulating means preferable takes the form of a generally ring shaped disk of an insulating material such as a ceramic of Boron nitride having a central bore and a plurality of radially and tangentially inwardly directed holes therethrough for passage of the propellant. This arrangement of holes through the insulating disk causes the propellant to be injected in a vortex flow pattern into and through the central passage. This vortex flow pattern continues as the propellant flows upstream into the convergent cathode cavity and downstream into the divergent portion of the anode to produce thrust.

The cathode body preferably further has a divergent constrictor portion merging with the convergent portion and forming the throat therebetween. In addition, the anode body preferably has an upstream constrictor portion merging into the divergent expansion portion of the cavity. The constrictor portion of the cathode body, the upstream constrictor portion of the anode body and the gap formed between the cathode body and the anode body by the insulating disk shaped member preferably form a slightly divergent constrictor through which the arc is forced by the propellant flow. The divergence of the constrictor enhances the stability of the split propellant flow.

The convergent portion of the cathode cavity preferably has a closed end opposite the throat. The propellant passing upstream through the throat into the convergent portion of the cathode body exits the cavity through the center of the vortex flow along the central axis. This is possible because, with the vortex flow of propellant, a low pressure region exists along the central axis and along the passage of the arc. The propellant flowing into the cathode cavity, pushing the arc attachment point into the convergent portion of the cathode cavity eventually turns around and passes downstream through the central low pressure region portion of the arc. Also, the vortex flow causes the cathode arc attachment to rotate to form the diffuse attachment.

Alternatively, a vent passage may be formed between the cathode cavity and the downstream portion of the anode cavity to provide a vent path for the portion of the propellant passing upstream into the cathode cavity. This vent path is not necessary for the arcjet thruster to function in accordance with the present invention as discussed above; however, the vent path may be advantageously employed to control the position of the anode arc attachment and provide some cooling to the anode body.

The diameter of the central axial bore through the insulator ring is preferably larger than that of the passage between the cathode and anode bodies so that the injected propellant sweeps the adjacent insulator surface clean of debris and prevent carbon tracking across the insulator. In addition, the vortex flow the propellant gas across the adjacent radial surfaces of both the anode and the cathode bodies also sweeps these areas free of debris. This action minimizes the potential for electrode burnout and cools the electrode surfaces which prolongs arcjet life.

These and other objects, features and advantages of the present invention will become apparent to those skilled in the art upon a reading of the following detailed description and appended claims when taken in conjunction with the drawing wherein there is shown and described illustrative embodiments of the invention.

In the course of the following detailed description, like reference characters designate like or corresponding parts throughout the several views of the drawing.

Figure 1:
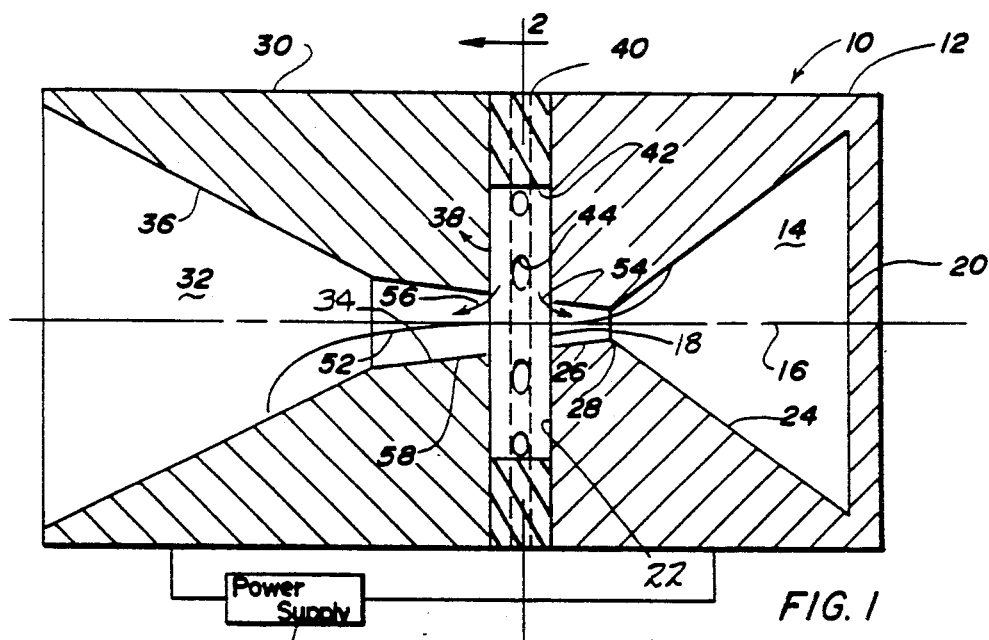
FIG. 1 is a schematic axial sectional view of a first embodiment of the arcjet thruster in accordance with the present invention.

The first preferred embodiment of the arcjet thruster in accordance with present invention is illustrated schematically in FIG. 1. The arcjet thruster 10 comprises an electrically conductive cathode body 12 having a convergent generally conical cathode cavity 14 therein which is symmetrical about a central axis 16 through the arcjet thruster 10. The cathode cavity 14 has an open end 18 and an opposite closed end 20. The cathode body 12 terminates in a generally flat radial surface 22 at the open end 18. The cathode cavity 14 further includes an upstream convergent portion 24 in tandem with a constrictor portion 26 forming a throat 28 therebetween. The constrictor portion 26 is preferably slightly divergent toward open end 18.

An electrically conductive anode body 30 having a divergent cavity 32 therein coaxial with the central axis 16 communicates with and is tandemly arranged and spaced from the open end 18 of the cathode body 12. The anode body 30 has an upstream constrictor portion 34 and a downstream expansion portion 36. The upstream end of the anode body 30 terminates in a flat radial surface 38.

Figure 2:
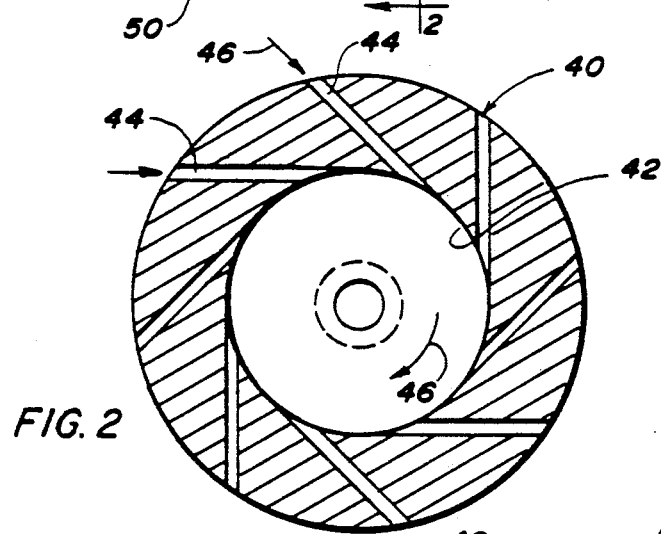
FIG. 2 is a sectional view taken on the line 2—2 in FIG. 1.

An insulator member 40 is sandwiched between radial surfaces 22 and 38 and tandemly spaces cathode body 12 from anode body 30 along central axis 16. The insulator member 40 is a ring shaped disk preferably of Boron nitride or other ceramic insulating material having a central bore 42 therethrough coaxial with the central axis 16. The disk 40 also has a plurality of preferably equally spaced propellant injection bores or holes extending radially through the disk shaped ring member 40 and tangentially into bore 42. These holes 44 radially direct propellant 46 in a vortex flow into bore 42 in a clockwise direction as illustrated by arrow 46 in the sectional view of insulator member 40 in FIG. 2.

A power supply 50, preferably producing a constant current, is connected between cathode body 12 and anode body 30. Voltage is impressed across cathode body 12 and anode body 30 so as to produce an arc 52 therebetween. Anode body 30 and cathode body 12 are preferably made of tungsten, thoriated tungsten, or other conductive refractory material to withstand the arc temperature.

In operation, the vortex flow of propellant 46 divides as it radially converges on the central axis 16. One portion 54 of the vortex flow of propellant 46 is directed upstream through the throat 28 into the convergent portion 24 of the cathode cavity 14. Another portion 56 of the propellant flow 46 passes downstream through the upstream divergent portion 34 of anode body 30 and out of the anode body through the divergent expansion portion 36 producing thrust.

The portion 54 of the vortex flow of the propellant 46 pushes the arc attachment at the cathode end of the arc 52 upstream into the convergent portion 24 of the cathode cavity 14. The other portion 56 of the vortex flow of propellant 46 pushes the downstream arc attachment point of the arc 52 into the downstream expansion portion 36 of the anode cavity 32.

The vortex flow of portions 54 and 56 of the propellant 46 causes the arc 52 to rotate and to attach at the cathode end in the convergent portion 24 in a diffuse manner. Similarly, the opposite end of the arc 52 is forced to attach in a diffuse manner in the downstream expansion portion 36 of anode cavity 32. In this way, the current density within the arc 52 at each attachment foot is spread over a large surface area of the cathode and anode bodies. In addition, the diffuse arc attachment at both ends of the arc causes the arc to be longer. This increases the thermal heat transfer and in turn produces a higher voltage for a given current level and a corresponding higher overall power.

The combination of the divergent portion 26 of the cathode body 12, the bore 42 of insulator disk 40, and the upstream divergent portion 34 of the anode body 30 forms a slightly divergent constrictor 58 wherein most of the ionization and heat transfer between the arc 52 and the propellant gas take place. The slightly divergent arrangement of the constrictor 58 assists in the division of the propellant flow 46 into the upstream directed portions 54 and the downstream directed portions 56. Preferably, only about 10 percent of the propellant 46 will be required to be diverted upstream to push the cathode arc attachment into the convergent portion 24 and produce diffuse arc attachment.

Figure 3:
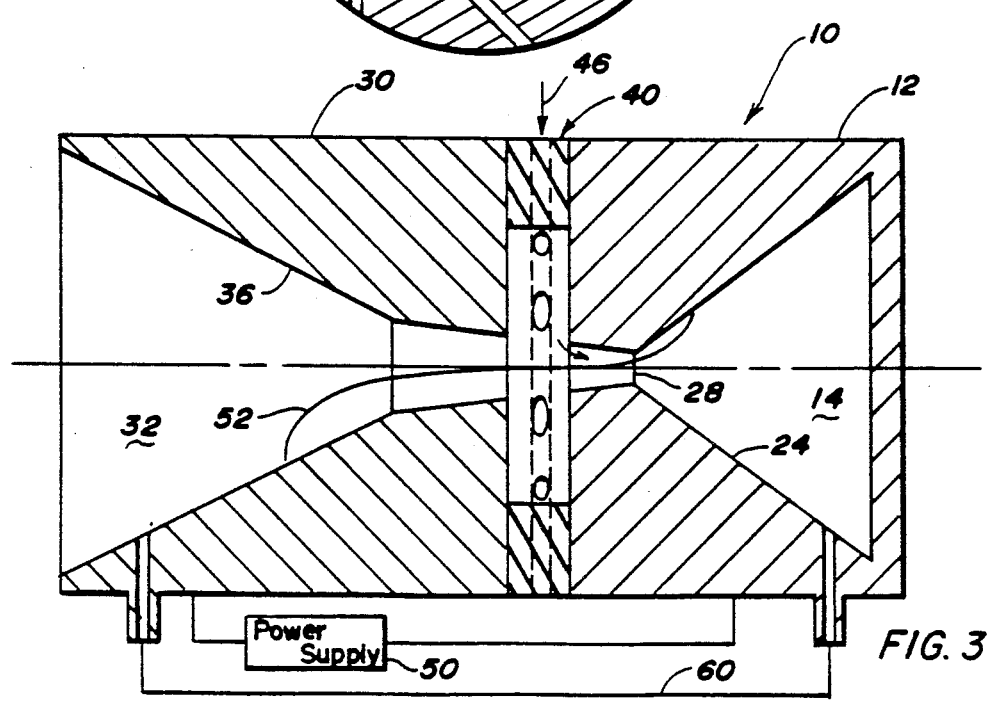
FIG. 3 is a schematic axial sectional view of an alternative embodiment of the present invention.

In the preferred embodiment shown in FIG. 1, the portion 54 of the propellant gas 46 that is directed upstream through throat 28 into the convergent portion 24 then reverses direction and exits downstream through the low pressure area along the central axis 16, back through throat 28 and into the divergent anode cavity 32. An alternative preferred embodiment is illustrated in FIG. 3. This embodiment is identical to that illustrated in FIGS. 1 and 2 with the addition of a propellant vent path through a conduit 60 from the convergent cathode cavity 14 to the divergent anode cavity 32. In this embodiment, the portion of propellant 46 passing upstream through the throat 28 into convergent portion 24 does not reverse direction as previously described but passes through the conduit 60. This portion may be used to cool the anode body 30 and/or may be utilized to direct the anode arc attachment in the divergent portion 36.

As can readily been seen by FIGS. 1 and 3, all of the advantages which result from diffuse arc attachment in the anode also apply to the cathode design. The diffuse arc attachment in the cathode of the present invention will produce much lower erosion rates and larger erosion volumes which in turn will yield a much longer life arcjet thruster compared to conventional designs.

The elongated length of the arc, because of the diffuse attachment at both ends, allows operation of the arcjet thruster at a higher running voltage and therefore operation at much higher power levels. In addition, higher current operation may also be utilized because of the diffuse cathode arc attachment.

While the above description is illustrative of the preferred embodiments of the present invention, it will be appreciated that the inventive concept of a convergent cathode cavity tandemly arranged with a divergent anode cavity forming a nozzle to achieve diffuse arc foot attachment at both ends of the arc may be practiced otherwise than as specifically described. Thus the embodiments of the invention are subject to modification, variation and change without departing from the proper scope and fair meaning of the appended claims. Accordingly, it is intended to embrace all such changes, modifications and variations that fall within the spirit and broad scope of the appended claims. All patent applications, patents and other publications cited herein are incorporated by reference in their entirety.

What is claimed is:

1. An arcjet thruster comprising:
   an electrically conductive cathode body having a cavity therein having an open end symmetrical about a central axis therethrough, said cathode cavity having a convergent portion forming a throat at said open end;
   an electrically conductive anode body having a cavity therein coaxial with said cathode cavity and communicating with said open end of said cathode cavity, said anode cavity having a divergent portion therein expanding away from said throat, said cavities defining a passage between said bodies along said axis;
   an electrical current supplying means connected to said anode body and said cathode body for producing an electrical arc between said anode and said cathode bodies through said passage; and
   means for injecting a propellant into said passage between said bodies such as to cause one portion of said propellant to pass into said passage and through said throat into said cathode cavity and another portion of said propellant to pass into said passage and through said divergent portion of said anode cavity to produce thrust, said one propellant portion causing one end of said arc to attach to said cathode beyond said throat in the convergent portion of said cathode cavity and the other propellant portion causing the other end of said arc to attach to said anode in the divergent portion of said anode cavity.

2. The arcjet thruster according to claim 1 further comprising an insulating means between said cathode and anode bodies for electrically separating said bodies along said axis.

3. The arcjet thruster according to claim 1 wherein said cathode body further comprises a constrictor portion in tandem with said convergent portion, said portions having said throat therebetween.

4. The arcjet thruster according to claim 2 wherein said insulating means axially spaces said cathode body from said anode body.

5. The arcjet thruster according to claim 4 wherein said insulating means comprises a generally disk shaped ring member having a central bore therethrough coaxial with said central axis, said member having at least one inlet hole extending radially through said disk and tangentially into said bore for injecting said propellant into said passage so as to create a vortex flow through said passage.

6. The arcjet thruster according to claim 3 wherein said constrictor portion diverges downstream of said throat.

7. The arcjet thruster according to claim 4 wherein said anode body further comprises an upstream portion in tandem with said divergent portion, said arc attaching to said anode body in said downstream portion.

8. The arcjet thruster according to claim 5 wherein said bore through said insulator disk has a diameter greater than said passage through said throat of said cathode, said bodies and said insulator disk defining a vortex forming chamber about said passage.

9. The arcjet thruster according to claim 6 wherein said insulating means comprises a generally disk shaped member having a central bore therethrough coaxial with said central axis, said member having at least one inlet hole extending radially through said disk and tangentially into said bore for injecting said propellant into said passage so as to create a vortex flow through said passage.

10. The arcjet thruster according to claim 9 wherein said insulating disk has a plurality of equally spaced inlet holes extending radially through said disk and tangentially into said bore.

11. The arcjet thruster according to claim 10 wherein said convergent portion of said cathode has a closed end opposite said throat so that said propellant passing through said throat into said convergent portion of said cathode body must exit said body through the center of said vortex flow along the central axis.

12. An arcjet thruster comprising:
an electrically conductive cathode body having a cavity therein symmetrical about a central axis therethrough, said cavity having a convergent portion in tandem with a coaxial divergent portion forming a throat therebetween;
an electrically conductive anode body having a divergent cavity therein coaxial with said divergent portion of said cathode cavity, said divergent cavity expanding away from said divergent portion, said divergent anode cavity having an upstream portion and a downstream portion;
an insulating means between said anode and said cathode bodies for physically and electrically separating said bodies along said axis, said bodies and said insulating means defining a passage therethrough along said axis;
an electrical current supplying means connected to said anode and said cathode for producing an electrical arc between said anode and said cathode through said passage; and
propellant injection means for injecting a propellant into said passage such as to cause a portion of said propellant to pass through said throat into said divergent portion of said cathode and another portion of said propellant to pass through said divergent anode cavity to produce thrust, said propellant portions pushing said arc through said passage causing one end of said arc to attach to said cathode in the convergent portion of said cathode cavity and the other end of said arc to attach to said anode in the downstream portion of said anode cavity.

13. The thruster according to claim 12 further comprising vent means for exhausting propellant from said cathode cavity to said anode cavity bypassing said central passage.

14. The thruster according to claim 13 wherein said insulating means comprises a disk shaped member having a central bore therethrough along said axis and at least one propellant inlet hole passing radially through said member and tangentially into said central bore so as to cause said propellant passing through said inlet hole into said bore to form a vortex flow through said central passage.

15. The thruster according to claim 14 wherein said convergent portion of said cathode has a closed end opposite said throat so as to force said propellant passing through said throat into said convergent portion of said cathode body to exit said body through the center of said vortex flow along the central axis.

16. The thruster according to claim 14 wherein said disk shaped insulating member has a plurality of said inlet holes spaced about said central bore.

* * * * *